2,871,240
Patented Jan. 27, 1959

2,871,240

DYESTUFFS DERIVED FROM 2,5-DIMETHOXY-TEREPHTHALOYL CHLORIDE AND AMINO 1,9-ANTHRAPYRIMIDINE

David I. Randall, New Vernon, N. J., and Nicholas W. Solonen, Ambler, Pa., assignors to General Aniline & Film Corporation, New York, N. Y., a corporation of Delaware No Drawing. Original application December 31, 1951, Serial No. 264,346. Divided and this application February 17, 1956, Serial No. 566,092

6 Claims. (Cl. 260—256.4)

This invention relates to novel vat dyestuffs of strong color and good light-fastness, obtained by condensing one reactive group of a 2,5-dimethoxyterephthaloyl chloride with an amino-anthrapyrimidine; and the other reactive group of the 2,5-dimethoxyterephthaloyl chloride with either an amino-anthrapyrimidine or an amino-anthraquinone.

Vat dyestuffs obtained by condensing amino-anthrapyrimidine with the acid halides of aromatic carboxylic acids, including terephthaloyl chloride, are known in the art, and are described in U. S. Patent 2,040,857, Kunz et al., issued May 19, 1936. However, it has been found that, when both reactive groups of terephthaloyl chloride are condensed with an amino-anthrapyrimidine, or when one group is condensed with an amino-anthrapyrimidine and the other with an amino-anthraquinone, the resulting amide is extremely difficult to vat, and is of little interest as a vat dyestuff.

It has been found, in accordance with the present invention that, if the terephthaloyl chloride used has two methoxy substituents, one in 2 position, and the other in 5 position, the products thereof, with amino-anthrapyrimidines or amino-anthrapyrimidines and amino-anthraquinones, are readily vattable, and have good color strength and other desirable properties, such as good light-fastness, for use as vat dyestuffs.

The details of the present invention, as well as the method of preparation of the novel dyestuffs embodied therein, will be apparent to those skilled in the art, from the consideration of the following specific examples which illustrate in detail preferred embodiments of this invention:

*Example 1.—Condensation product of 2,5-dimethoxyterephthaloyl chloride and two moles 5-amino-1,9-anthrapyrimidine*

Fifteen parts of 2,5-dimethoxyterephthalic acid was added to 140 parts of anhydrous o-dichlorobenzene, followed by the addition of 20 parts of thionyl chloride. The resulting charge was gradually brought up to 140° C. and maintained at that temperature with efficient stirring for about three hours. At the end of this time, the excess of thionyl chloride was removed by distillation in the usual manner and the original volume of the reaction mixture restored by the addition of anhydrous o-dichlorobenzene. The resulting acid chloride solution was added to a suspension of 30 parts of 5-amino-1,9-anthrapyrimidine in 272 parts of anhydrous o-dichlorobenzene containing 30 parts of pyridine at 80° C. The resulting mixture was gradually brought up to 125° C. and maintained with stirring for about four hours. After cooling to room temperature, the condensation product was filtered, washed with the above-mentioned solvents and dried. The product thus obtained is a strong yellow vat dyestuff with a greenish hue that possesses good fastness properties.

*Example 2.—Condensation product of 2,5-dimethoxyterephthaloyl chloride and two moles 4-amino-1,9-anthrapyrimidine*

Fifteen parts of 2,5-dimethoxyterephthalic acid was added to 140 parts of anhydrous o-dichlorobenzene followed by the addition of 20 parts of thionyl chloride. The resulting charge was gradually brought up to 140° C. and maintained at that temperature with efficient stirring for about three hours. At the end of this time, the excess of thionyl chloride was removed by distillation in the usual manner. The acid chloride solution was then cooled to 80° C. and added to a solution 80° C. composed of 30 parts of 4-amino-1,9-anthrapyrimidine, 33 parts pyridine and 272 parts of anhydrous o-dichlorobenzene. The resulting mixture was gradually brought up to 125° C. and maintained with stirring for about four hours. After cooling to room temperature, the condensation product was filtered and washed in the above-mentioned manner and dried. The product thus obtained is a strong yellow vat dyestuff with a greenish hue, that possesses good fastness properties.

*Example 3.—Condensation product of 2,5-dimethoxyterephthaloyl chloride and 1-aminoanthraquinone with 5-amino-1,9-anthrapyrimidine*

Fifteen parts of 2,5-dimethoxyterephthalic acid was added to 140 parts of anhydrous o-dichlorobenzene followed by the addition of 20 parts of thionyl chloride. The resulting charge was gradually brought up to 140° C. and maintained at that temperature with efficient stirring for about three hours. At the end of this time, the excess of thionyl chloride was removed by distillation as above and the acid chloride solution cooled to 70° C. Four parts of finely powdered 1-aminoanthraquinone was then added and the temperature raised to 90° C. and maintained with efficient stirring and exclusion of moisture. The reaction was kept at this temperature for about four hours. The temperature was then raised until solution had been effected, and on cooling, the condensation product of one mole of 2,5-dimethoxyterephthaloyl chloride and one mole α-aminoanthraquinone precipitated in the form of yellow crystals. The excess of 2,5-dimethoxyterephthaloyl chloride was washed out with benzene.

The thus obtained product was added to a solution of 90 parts of anhydrous o-dicholorbenzene containing 4.5 parts of 5-amino-1,9-anthrapyrimidine and 4.5 parts of pyridine. The temperature of the resulting mixture was gradually raised to 125° C. and maintained with efficient stirring until the reaction was complete. After cooling to room temperature, the condensation product of 2,5-dimethoxyterephthaloyl chloride and 1-amino-anthraquinone with 5-amino-1,9-anthrapyrimidine was filtered off and washed as above and dried. The product is a strong yellow vat dyestuff with a greenish hue, that possesses good fastness characteristics.

*Example 4.—Condensation product of 2,5-dimethoxyterephthaloyl chloride and 1-aminoanthraquinone with 4-amino-1,9-anthrapyrimidine*

The intermediate product as obtained according to Example 3 from 4 parts of 1-aminoanthraquinone was added to 90 parts of anhydrous o-dichlorobenzene containing 4.5 parts of 4-amino-1,9-anthrapyrimidine and 4.5 parts of pyridine. The temperature of the resulting mixture was gradually brought up to 125° C. and maintained with efficient stirring until the reaction was complete. After cooling to room temperature, the condensation product of 2,5-dimethoxyterephthaloyl chloride and 1-aminoanthraquinone with 4-amino-1,9-anthrapyrimidine was filtered off and washed as above and dried. The product thus obtained is a strong yellow vat dyestuff with a greenish hue that possesses good fastness properties.

*Example 5.—Condensation product of 2,5-dimethoxyterephthaloyl chloride and 1 - amino - 5 - benzoylaminoanthraquinone with 5-amino-1,9-anthrapyrimidine*

Fifteen parts of 2,5-dimethoxyterephthalic acid was added to 140 parts of anhydrous o-dichlorobenzene, followed by the addition of 20 parts of thionyl chloride, and the resulting mixture gradually brought up to 140° C. The reaction mixture was maintained at that temperature with efficient stirring for about three hours. At the end of this time, the excess of thionyl chloride was removed by distillation as above and the acid chloride solution cooled to 70° C. Six parts of finely powdered 1-amino-5-benzoylaminoanthraquinone was then added and the temperature raised to 155–160° C. It was maintained at this temperature with efficient stirring and exclusion of moisture until the reaction was complete. After cooling to room temperature, the condensation product of 2,5-dimethoxyterephthaloyl chloride and 1-amino-5-benzoylaminoanthraquinone was filtered off and washed with benzene to remove the excess 2,5-dimethoxyterephthaloyl chloride.

The thus obtained intermediate product was added to 90 parts of anhydrous o-dichlorobenzene containing 4.5 parts of 5-amino-1,9-anthrapyrimidine and 4.5 parts of pyridine. The temperature of the resulting mixture was gradually brought up to 125° C. and maintained with stirring for about four hours. After cooling to room temperature, the condensation product of 2,5-dimethoxyterephthaloyl chloride and 1 - amino - 5 - benzoylaminoanthraquinone with 5-amino-1,9-anthrapyrimidine was filtered off and washed as above and dried. The product thus obtained is a strong yellow vat dyestuff that possesses good fastness properties.

*Example 6.—Condensation product of 2,5-dimethoxyterephthaloyl chloride and 1-amino-5-benzoylaminoanthraquinone with 4-amino-1,9-anthrapyrimidine*

The intermediate product as is obtained according to Example 5, from six parts of 1-amino-5-benzoylaminoanthraquinone was added to 90 parts of anhydrous o-dichlorobenzene containing 4.5 parts of 4-amino-1,9-anthrapyrimidine and 4.5 parts of pyridine. The temperature of the resulting mixture was gradually brought up to 125° C. and maintained with stirring for about four hours. After cooling to room temperature, the condensation product of 2,5-dimethoxyterephthaloyl chloride and 1-amino-5-benzoylaminoanthraquinone with 4-amino-1,9-anthrapyrimidine was filtered off and washed as above and dried. The product thus obtained is a strong yellow vat dyestuff of good fastness properties.

*Example 7.—Condensation product of 2,5-dimethoxyterephthaloyl chloride and 1-amino-4-benzoylaminoanthraquinone with 5-amino-1,9-anthrapyrimidine*

Fifteen parts of 2,5-dimethoxyterephthalic acid was added to 140 parts of anhydrous o-dichlorobenzene followed by the addition of 20 parts of thionyl chloride and the resulting mixture gradually brought up to 140° C. The reaction was maintained for three hours at this temperature with efficient stirring and the exclusion of moisture. At the end of this time, the excess thionyl chloride was removed by distillation as above. The acid chloride solution was then cooled to 70° C. and 6 parts of finely powdered 1-amino-4-benzoylaminoanthraquinone added and the temperature raised to 155–160° C. The reaction was maintained at this temperature with efficient stirring and exclusion of moisture for about four hours. After cooling to room temperature, the condensation product of 2,5-dimethoxyterephthaloyl chloride and 1-amino-4-benzoylaminoanthraquinone was filtered off and washed with benzene to remove the excess 2,5-dimethoxyterephthaloyl chloride. The condensation product thus obtained was introduced into a solution of 4.5 parts of 5-amino-1,9-anthrapyrimidine, 4.5 parts of pyridine and 90 parts of anhydrous o-dichlorobenzene. The temperature of the resulting mixture was then gradually brought up to 125° C. and maintained with efficient stirring for about four hours. After cooling to room temperature, the condensation product of 2,5-dimethoxyterephthaloyl chloride with 1-amino-4-benzoylaminoanthraquinone and 5-amino-1,9-anthrapyrimidine was filtered off and washed as above, and dried. The product thus obtained is a strong reddish-yellow vat dyestuff that possesses good fastness characteristics.

*Example 8.—Condensation product of 2,5-dimethoxyterephthaloyl chloride and 1-amino-4-benzoylaminoanthraquinone with 4-amino-1,9-anthrapyrimidine*

The intermediate product, as is obtained according to Example 7 from 6 parts of 1-amino-4-benzoylaminoanthraquinone, was added to a solution of 4.5 parts of 4-amino-1,9-anthrapyrimidine, 4.5 parts of pyridine and 90 parts of anhydrous o-dichlorobenzene. The temperature of the resulting charge was then gradually brought up to 125° C. and maintained at this temperature with efficient stirring for about four hours. After cooling to room temperature, the condensation product of 2,5-dimethoxyterephthaloyl chloride with 1-amino-4-benzoylaminoanthraquinone and 4-amino-1,9-anthrapyrimidine was filtered off, washed as above, and dried. The product so obtained is a strong reddish-yellow vat dyestuff that possesses good fastness properties.

*Example 9.—Condensation product of 2,5-dimethoxyterephthaloyl chloride and 4-amino-1,9-anthrapyrimidine with 5-amino-1,9-anthrapyrimidine*

Fifteen parts of 2,5-dimethoxyterephthalic acid was added to 140 parts of anhydrous o-dichlorobenzene followed by the addition of 20 parts of thionyl chloride. The resulting charge was gradually brought up to 140° C. and maintained at that temperature with efficient stirring for about three hours. At the end of this time, the excess of thionyl chloride was removed by distillation in the above manner and the acid chloride solution cooled to 70° C. 4.5 parts of pyridine and 4.5 parts of 5-amino-1,9-anthrapyrimidine were added and the temperature of the reaction mixture brought up to 125° C. It was maintained at this temperature with efficient stirring and exclusion of moisture for about four hours. After cooling to room temperature, the condensation product of 2,5-dimethoxyterephthaloyl chloride with 5-amino-1,9-anthrapyrimidine was filtered off and the presscake washed with benzene to remove excess 2,5-dimethoxyterephthaloyl chloride.

The product thus obtained was introduced into a solution of 4.5 parts of 4-amino-1,9-anthrapyrimidine, 4.5 parts pyridine and 90 parts of anhydrous o-dichlorobenzene and the temperature raised to 125° C. gradually. The reaction mixture was maintained at this temperature with efficient stirring and exclusion of moisture for about four hours. After cooling to room temperature the condensation product of 2,5-dimethoxyterephthaloyl chloride with 5-amino-1,9-anthrapyrimidine and 4-amino-1,9-anthrapyrimidine was filtered off and washed in the above manner and dried. The product so obtained is a strong yellow vat dyestuff with a greenish hue that possesses good fastness characteristics.

*Example 10.—Condensation product of 2,5-dimethoxyterephthaloyl chloride and 1-amino-4-methoxyanthraquinone with 5-amino-1,9-anthrapyrimidine*

Fifteen parts of 2,5-dimethoxyterephthalic acid was added to 140 parts of anhydrous o-dichlorobenzene followed by the addition of 20 parts of thionyl chloride. The resulting charge was gradually brought up to 140° C.

and maintained at that temperature with efficient stirring for about three hours. At the end of this time, the excess thionyl chloride was removed by distillation in the above manner and the acid chloride solution cooled to 70° C. 4.5 parts of finely powdered 1-amino-4-methoxy-anthraquinone was then added and the temperature raised to 90° C. The reaction mixture was maintained at this temperature with efficient stirring for about four hours. The temperature was then raised until solution had been effected, and, on cooling, the condensation product of one mole 2,5-dimethoxyterephthaloyl chloride with one mole 1-amino-4-methoxyanthraquinone was filtered off, and washed with benzene to remove any 2,5-dimethoxy-terephthaloyl chloride present.

The thus obtained intermediate product was added to 90 parts of anhydrous o-chlorobenzene followed by the addition of 4.5 parts of 5-amino-1,9-anthrapyrimidine and 4.5 parts of pyridine. The resulting charge was gradually brought up to 125° C. and maintained at that temperature for about four hours. After cooling to room temperature, the condensation product of 2,5-dimethoxyterephthaloyl chloride with 1-amino-4-methoxyanthraquinone and 5-amino-1,9-anthrapyrimidine was filtered, washed and dried. The product thus obtained is a reddish-yellow dyestuff of good fastness properties.

*Example 11.—Condensation product of 2,5-dimethoxyterephthaloyl chloride and 1-amino-4-methoxyanthraquinone with 4-amino-1,9-anthrapyrimidine*

The intermediate product as obtained according to Example 10 from 4.5 parts of 1-amino-4-methoxyanthraquinone was added to 90 parts of anhydrous o-dichlorobenzene, followed by the addition of 4.5 parts of 4-amino-1,9-anthrapyrimidine and 4.5 parts of pyridine. The resulting charge was gradually brought up to 125° C. and maintained at that temperature for about four hours. After cooling to room temperature, the condensation product from 2,5-dimethoxyterephthaloyl chloride with 1 - amino - 4 - methoxyanthraquinone and 4-amino-1,9-anthrapyrimidine was filtered off, washed with the above solvents and dried. The product thus obtained is a strong reddish-yellow vat dyestuff of good fastness properties.

*Example 12.—Condensation product of 2,5-dimethoxyterephthaloyl chloride and 6-chloro-1-aminoanthraquinone with 5-amino-1,9-anthrapyrimidine*

Fifteen parts of 2,5-dimethoxyterephthalic acid was added to 140 parts of anhydrous o-dichlorobenzene followed by the addition of 20 parts of thionyl chloride. The resulting charge was gradually brought up to 140° C. and maintained at that temperature with efficient stirring for about three hours. At the end of this time, the excess thionyl chloride was removed by distillation in the above manner and the acid chloride cooled to 70° C. 4.6 parts of finely powdered 1-amino-6-chloroanthraquinone was then added and the temperature raised to 120° C. The reaction mixture was maintained at this temperature with efficient stirring and exclusion of moisture for about four hours. The temperature was then raised until solution had been effected and on cooling to room temperature, the condensation product of 2,5-dimethoxyterephthaloyl chloride and 6-chloro-1-aminoanthraquinone was filtered off and washed with benzene to remove any excess 2,5-dimethoxyterephthaloyl chloride.

The intermediate product thus obtained was added to 90 parts of anhydrous o-dichlorobenzene, followed by the addition of 4.5 parts of pyridine. The resulting charge was gradually brought up to 125° C. with efficient stirring and maintained at this temperature, for about four hours. After cooling to room temperature, the condensation product from 2,5-dimethoxyterephthaloyl chloride with 1-amino-6-chloroanthraquinone and 5-amino-1,9-anthrapyrimidine was filtered off and washed with the above solvents, and dried. The product thus obtained is a strong yellow vat dyestuff of good fastness properties.

*Example 13.—Condensation product of 2,5-dimethoxyterephthaloyl chloride and 6-chloro-1-aminoanthraquinone with 4-amino-1,9-anthrapyrimidine*

The intermediate product, as obtained according to Example 12, from 4.6 parts of finely powdered 1-amino-6-chloroanthraquinone was added to 90 parts of anhydrous o-dichlorobenzene followed by the addition of 4.5 parts of 4-amino-1,9-anthrapyrimidine and 4.5 parts of pyridine. The resulting mixture was gradually brought up to 125° C. with efficient stirring and maintained at that temperature for about four hours. After cooling to room temperature, the condensation product from 2,5-dimethoxyterephthaloyl chloride with 6-chloro-1-aminoanthraquinone and 4-amino-1,9-anthrapyrimidine was filtered off, washed with the above solvents and dried. The product thus obtained is a strong yellow vat dyestuff of good fastness properties.

While 4-amino-1,9-anthrapyrimidine and 5-amino-1,9-anthrapyrimidine were used in preparing the products described in the foregoing examples, and are generally to be preferred as being the most readily produced of the amino-anthrapyrimidines, it should be understood that the dyestuffs obtained, in accordance with the present invention, by condensation of other aminoanthrapyrimidines with 2,5-dimethoxyterephthaloyl chloride, have substantially improved vattability over the corresponding products obtained by condensation with unsubstituted terephthaloyl chloride. Therefore, other amino-1,9-anthrapyrimidines of the type described in U. S. Patent 2,040,858, Kunz et al., such as 6-, 7- or 8-amino-1,9-anthrapyrimidine may be employed, if desired.

The present application is a division of our co-pending application, Serial No. 264,346, filed December 31, 1951, now abandoned.

We claim:

1. Vat dyestuffs of the formula

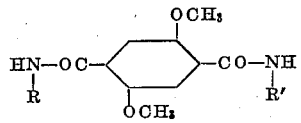

wherein

represents a member of the group consisting of aminoanthraquinone and amino 1,9 anthrapyrimidine radicals, and R' represents an amino 1,9 anthrapyrimidine radical.

2. Vat dyestuffs of the formula

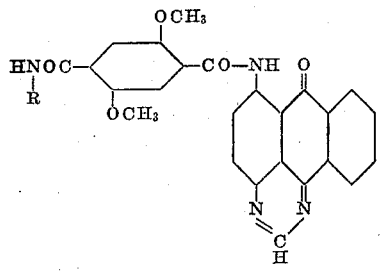

wherein

represents a member of the group consisting of aminoanthraquinone and amino 1,9 anthrapyrimidine radicals, 3. Vat dyestuffs of the formula
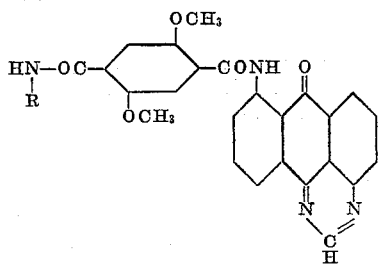
wherein
represents a member of the group consisting of amino anthraquinone and amino 1,9 anthrapyrimidine radicals.
4. Vat dyestuffs of the formula
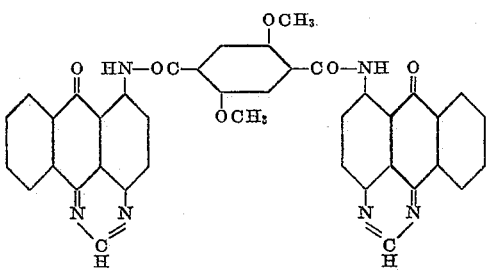
5. Vat dyestuffs of the formula
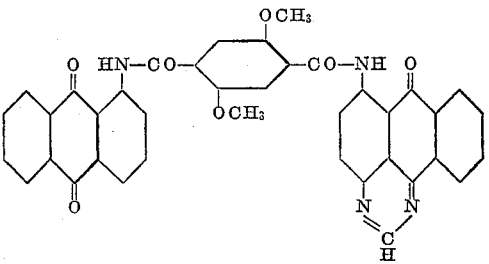
6. Vat dyestuffs of the formula
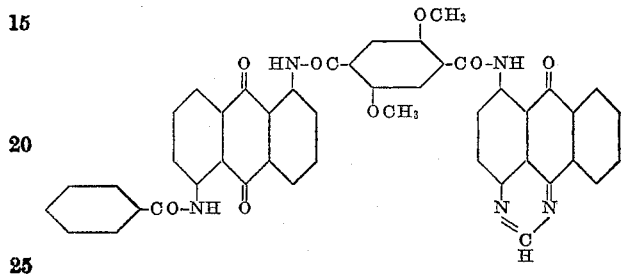
References Cited in the file of this patent
UNITED STATES PATENTS
| | | |
|---|---|---|
| 2,040,857 | Kunz et al. | May 19, 1936 |
| 2,299,141 | Hauser et al. | Oct. 20, 1942 |